UNITED STATES PATENT OFFICE.

EVAGHORAS SERGHISON, OF SAN FRANCISCO, CALIFORNIA.

MEDICINAL COMPOUND.

1,368,974. Specification of Letters Patent. Patented Feb. 15, 1921.

No Drawing. Application filed April 3, 1919. Serial No. 287,237.

*To all whom it may concern:*

Be it known that I, EVAGHORAS SERGHISON, a citizen of the United States, residing at San Francisco, in the county of San Francisco and State of California, have invented certain new and useful Improvements in Medicinal Compounds, of which the following is a specification.

My invention relates to a remedy or medicinal composition for use in the treatment of tuberculosis.

The aim of the invention is of course, the provision of a remedy which will prove effective in the treatment of tuberculosis. In actual use I have found that the remedy is most beneficial and far superior to any remedy for tuberculosis known to me. This result is due to the combination of the several ingredients of the compound as hereinafter stated; each ingredient separately having been tried or tested for the treatment of tuberculosis, and found ineffective to produce the desired result.

The remedy comprises the following ingredients in the proportions stated.

| | |
|---|---|
| Pure olive oil | 1 gallon. |
| Squill root | 3 pounds. |
| Bitter almonds | 1¼ pounds. |
| Nettle (the plant except the root) | 1½ pounds. |
| Red poppy flower (petals) | 1 pound. |

In preparing the remedy the several ingredients are placed in a suitable container and thoroughly mingled by shaking or agitation. The container is then corked or closed in an air-tight manner and placed in water contained in a receptacle. The receptacle is placed adjacent a stove so that the heat therefrom will warm the water and accordingly warm the mixture gradually. The mixture is left thus standing for a considerable period of time. In actual use I have found that seventy-two hours is about the proper time. At the expiration of this period the mixture is thoroughly mixed and squeezed and thereupon filtered; the liquid produced being used as the remedy.

In actual use I have found that a patient should be given about three tablespoonfuls a day, and the remedy or medicine should be taken in a lukewarm condition.

Having thus described my invention what I claim as new and desire to secure by Letters Patent, is:—

1. A medicinal composition for the treatment of tuberculosis, consisting of olive oil, squill root, bitter almonds, nettle plant and poppy petals, as described and for the purpose specified.

2. A medicinal composition consisting of olive oil, one gallon; squill root, three pounds; bitter almonds, one and one fourth pounds; nettle plant, (except the root), one and one-half pounds, and poppy petals, one pound; as described and for the purpose specified.

3. A medicinal composition comprising substantially equal proportions of bitter almonds and nettle and poppy flower and a larger proportion of squill root, all in a menstruum of olive oil.

In testimony whereof I affix my signature in presence of two witnesses.

EVAGHORAS SERGHISON.

Witnesses:
 HAROLD CHANCEY,
 CHARLES N. GILLORY.